Figure 1:
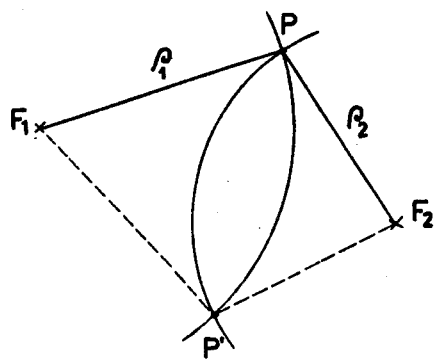

Aug. 31, 1965  B. H. BJÖRKMAN  3,204,241
RADIO NAVIGATION APPARATUS
Filed Feb. 25, 1963  6 Sheets-Sheet 1

INVENTOR.
BENGT H. BJÖRKMAN
BY
*Frank R. ⎯⎯*
AGENT

INVENTOR.
BENGT H. BJÖRKMAN

United States Patent Office 3,204,241
Patented Aug. 31, 1965

3,204,241
RADIO NAVIGATION APPARATUS
Bengt Harry Björkman, Sollentuna, Sweden, assignor to North American Philips Company, Inc., New York, N.Y., a corporation of Delaware
Filed Feb. 25, 1963, Ser. No. 260,434
Claims priority, application Sweden, Feb. 28, 1962, 2,217/62
16 Claims. (Cl. 343—112)

The present invention relates to a radio navigation apparatus in which the phase position of a radio carrier in relation to a comparison wave of the same frequency is used for representing the distance from at least one radio transmitter and comprising a phase detector for comparing the mutual phase positions of the two waves.

When transmitting a radio frequency carrier from a transmitter to a receiver, which latter is in motion relative to the transmitter, the received wave will deviate in frequency by a small value, called the Doppler-shift, from the frequency of the transmitted wave. The receiver is required to have a small band width in order to suppress disturbing signals and make possible the use of weak signals. However, theoretically if no special measures are taken the minimum band width of the receiver must equal twice the maximum Doppler-shift. On the other hand the indication of the full Doppler-shift is necessary to calculate the position, as the integrated value of the Doppler-shift is a measure of the distance travelled.

In order to decrease the band width it has previously been proposed to let the output from the phase detector work upon an oscillator delivering one of the input signals to the phase detector for regulating the frequency of the oscillator such that it follows the variations of the incoming frequency. Due to the fact that this regulation loop has a slow response an error voltage will appear at the output of the phase detector under transient conditions, i.e. during velocity changes, and in this case the minimum band width will be determined by the maximum allowable error voltage at the output of the phase detector. It has appeared that with acceleration values and maximum error voltage of normal magnitudes the band width cannot be decreased under the said theoretical value of double maximum Doppler-shift.

The object of the invention is to make possible a substantial decrease of the receiver band width as compared with the minimum band width possible in hitherto known systems.

According to the invention this is achieved in that in at least one of the input lines to the phase detector there is included a phase shift device, which is controlled on the one hand by means of a signal derived from the output of the phase detector, so that a closed regulation circuit, preferably containing at least one integrator, is formed and on the other hand by means of a signal derived from the output of a speed measuring device for measuring the speed in the direction to that actual radio station ($s$) and connected to the navigation apparatus but controlled independently of the said carrier, for example included in a coarse navigation device working according to the principle for dead reckoning and normally situated in the vehicle, the arrangement being such that the signal derived from the phase detector is combined with the signal derived from the speed measuring device to form a control signal for the phase shift device causing the same to bring about a phase shift resulting in continuous reduction of the output voltage of the phase detector to zero, the said closed regulation circuit furthermore comprising an extremely narrow filter which substantially only passes an information quantity corresponding to the maximum error in the velocity as measured by the said speed measuring device.

By combining the radio navigation system with a speed measuring device which responds immediately upon velocity changes and delivers the main part of the information quantity necessary for compensating the Doppler-shift, the radio navigation system has to handle an information quantity only corresponding to the error in the indication from the speed measuring device and the band width of the radio navigation system can be highly decreased.

The narrow filter may be arranged on the high frequency side of the phase detector and shaped as a band pass filter or alternatively arranged at the output of the phase detector and shaped as a low pass filter.

The phase shift device may be controlled by the output signal from a coarse navigation device, which output signal represents the distance to the actual radio station computed by the said coarse navigation device.

As the phase position of the incoming signal relative to a reference phase is a measure of the distance as measured by the radio navigation system, which distance is assumed to be correct, while the phase shift produced by the phase shift device in the Doppler-shift counteracting direction is a measure of the distance as measured by the coarse navigation device the output from the phase detector will represent the error in distance as measured by the coarse navigation device and in a further development of the principle of the invention the output signal from the phase detector therefore is used for supporting or correcting the coarse navigation device, so that the output signal from the phase detector in the feed-back system is regulated against zero. The means required for presentation of output data are in this case preferably associated with the coarse navigation device. From the view of disturbance such a combination shows great advantages, as the coarse navigation device, if the radio transmission for some reason should be put out of function, continues to compute the position, even if the error will increase in this case. The narrow transmission channel also results in that the radio navigation system is automatically put out of function when its accuracy is decreasing, as the narrow transmission channel in this case is not able to transmit the correction signal required for correcting the coarse navigation device to coherence with the radio navigation system.

The principles of the invention may be used in navigation systems of so called circular $f$-$f$ type as well as in hyperbolic systems. In the said last case the phase shift device can according to a modification of the invention be controlled by a signal representing a computed distance difference instead of a computed distance. The same compensation for the Doppler effect is achieved in this case.

Figure 2:
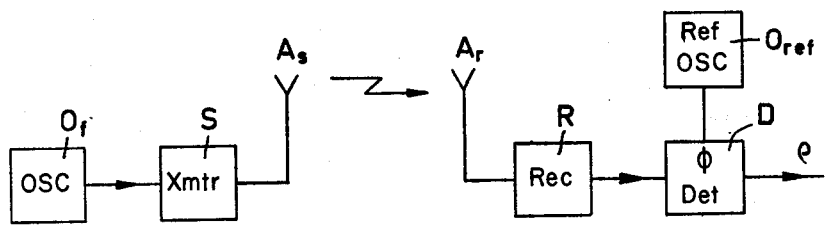
Figure 3:
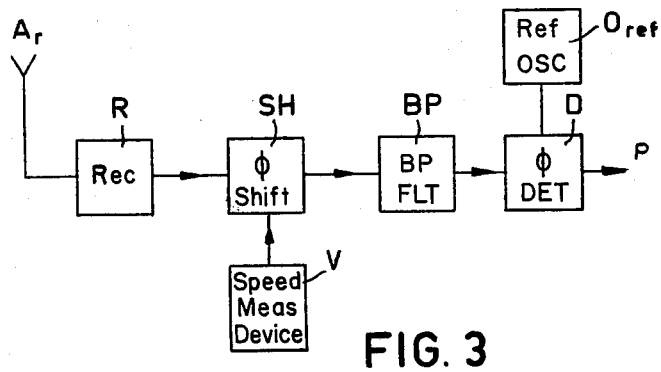
Figure 3A:
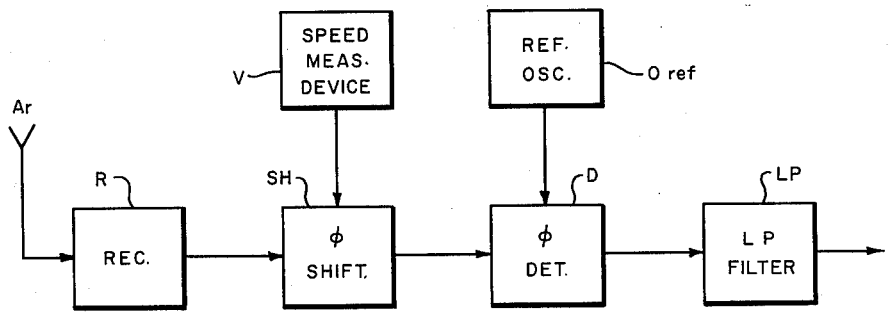
Figure 3B:
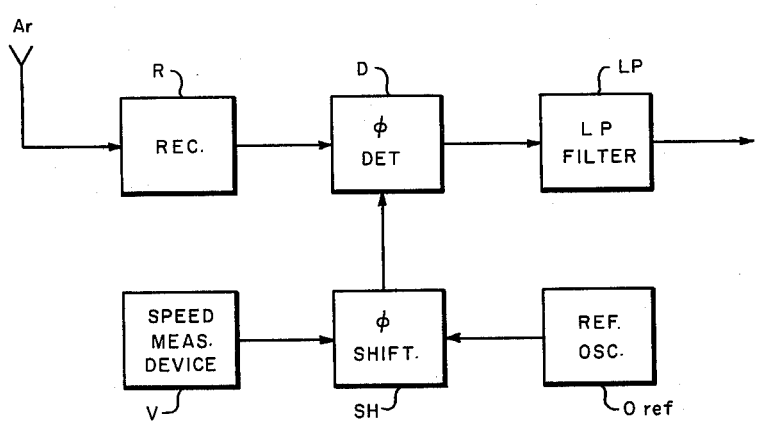
Figure 4:
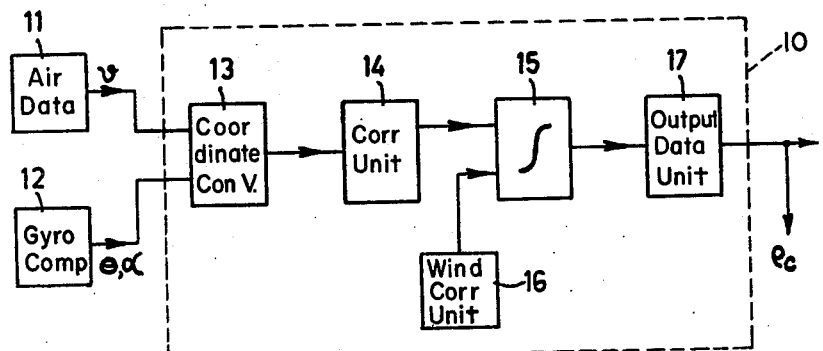
Figure 5:
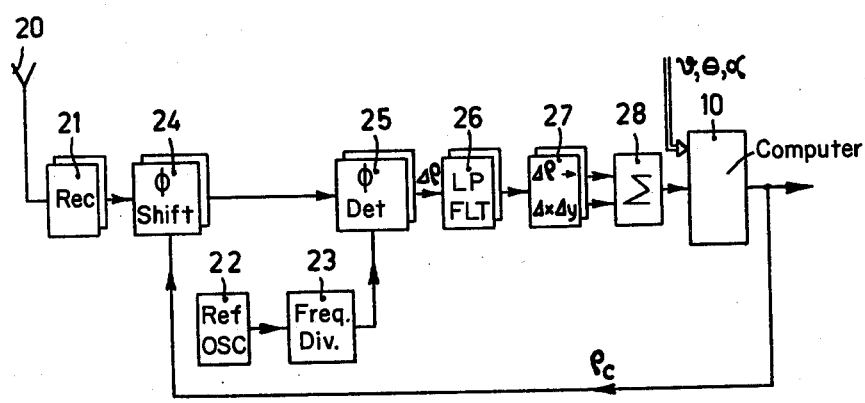
Figure 5A:
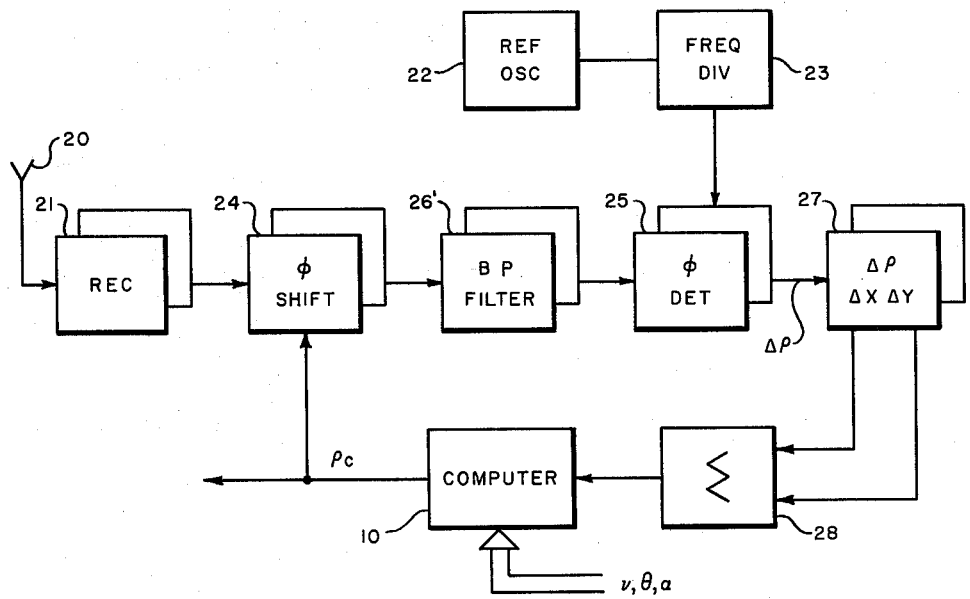
Figure 8A:
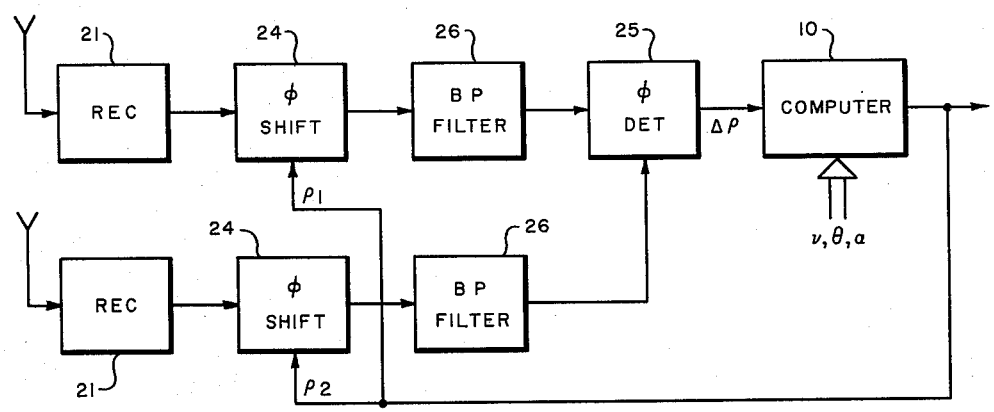
Figure 6:
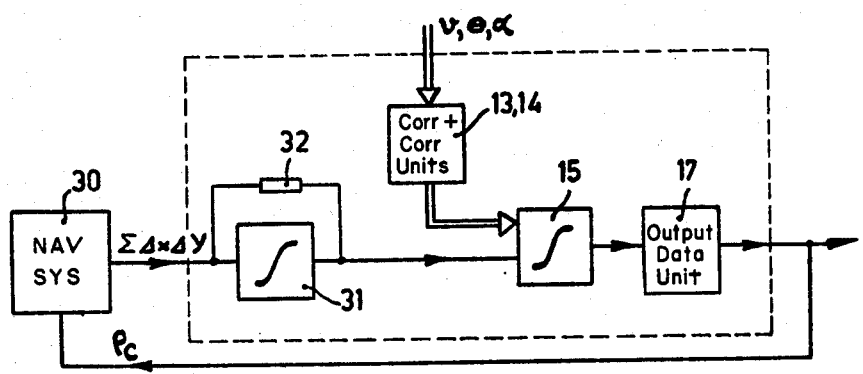
Figure 7:
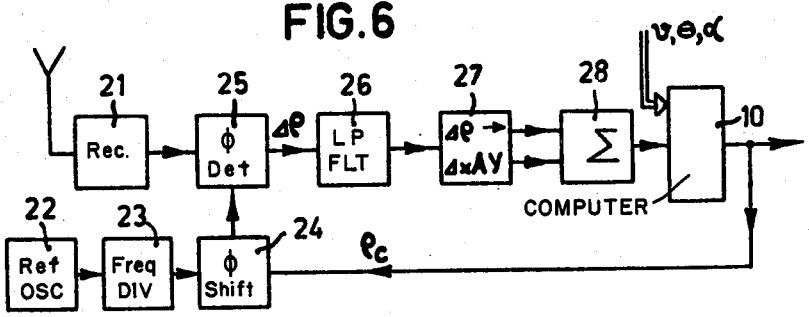
Figure 8:
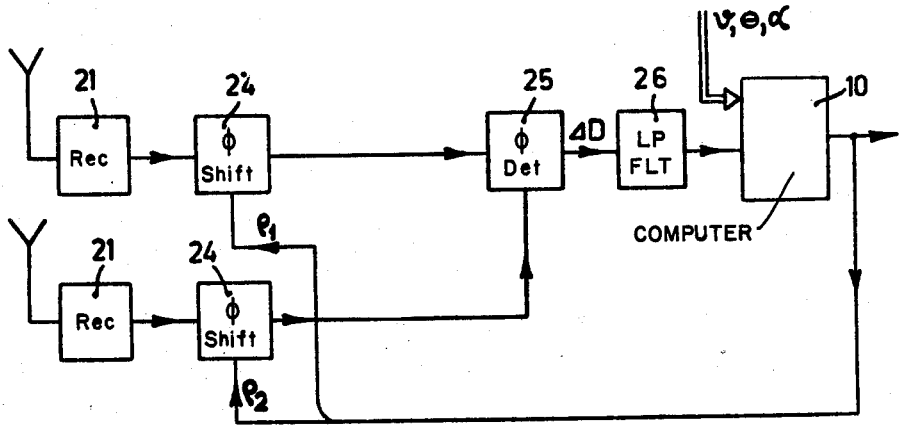
Figure 9:
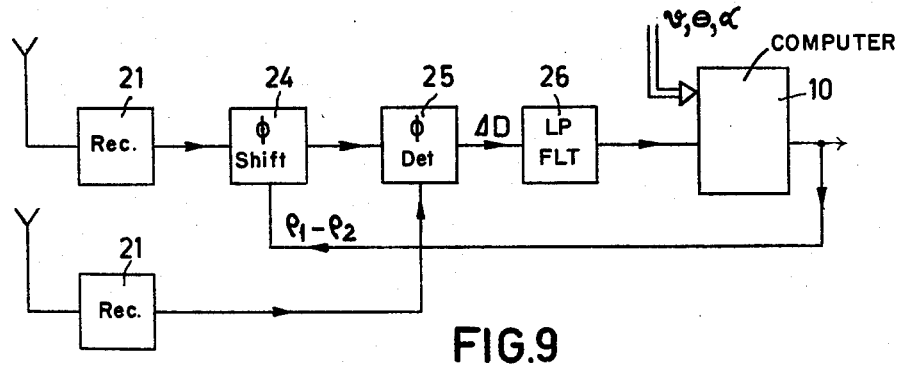
Figure 10:
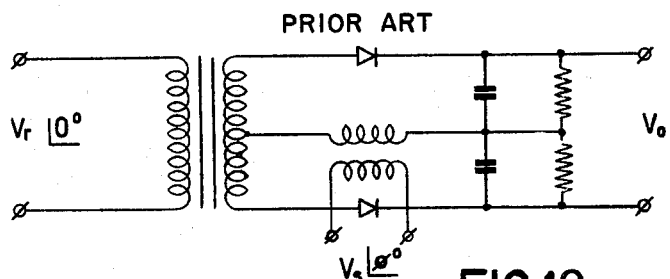
Figure 11:
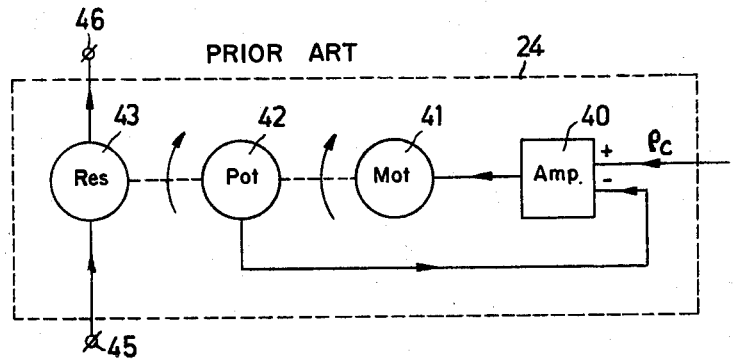

The invention is explained more fully in the following by means of example with reference to the accompanying drawings, in which FIG. 1 shows the geometrical configuration of a radio navigation system of so called circular $f$-$f$ type, FIG. 2 shows schematically a radio navigation system in which the principles according to the invention can be used, FIGS. 3, 3a and 3b are block diagrams for illustrating three modifications of the principles of the invention, FIG. 4 shows a block diagram for an automatic dead reckoning device of conventional type, which can be used as coarse navigation device in the apparatus according to the invention, FIGS. 5 and 5a illustrate in block schematic form two complete receivers constructed according to the principles of the invention, FIG. 6 shows a simplified block diagram of a suitable embodiment, FIG. 7 shows an alternative to the embodiment shown in FIG. 5, FIGS. 8 and 8a illustrate receivers according to the invention, each adapted for a radio navigation system working according to the hyperbolic principle, FIG. 9 shows an alternative to the embodiment shown in FIG. 8 and FIGS. 10 and 11 show embodiments known per se of a phase detector and a phase shift device, respectively, which may be used in the devices shown and described.

In FIG. 1 the references $F_1$ and $F_2$ designate two radio stations having known coordinates and P designates the instantaneous position of an aeroplane the position of which is to be determined. In the illustrated example the position of the aeroplane is determined by measuring the distances $f_1$ and $f_2$ to the radio station $F_1$ and $F_2$, respectively. Such a measurement of the distances only, will however not give sufficient information for separating the correct solution P from the false solution P and furthermore the $f$ determination is ambiguous as a certain phase position is repeated each wave length. As will be evident from the following, however, the correct solution will be selected automatically in the corrected system according to the invention.

FIG. 2 shows a block diagram for illustrating the principle of a radio navigation system, which can be modified according to the invention. In the figure the left hand part refers to the equipment situated on the ground and the right hand part to the equipment situated on the aeroplane. The equipment situated on the ground consists in a highly stable oscillator $O_f$, a transmitter amplifier S and a transmitter aerial $A_s$ for transmitting an unmodulated long wave high frequency carrier. The equipment situated in the aeroplane consists in a receiver aerial $A_r$, a receiver amplifier R, a highly stable reference oscillator $O_{ref}$ and a phase detector D, to which is fed the output signal from the reference oscillator and the received and amplified signal from the radio station. The phase detector may be of any conventional type and produces an output signal which is substantially proportional to the deviation of the phase difference between the two input signals from a predetermined value, for example the phase difference O, the sign of the output signal being dependent on the direction of the said deviation. Provided that the two oscillators being so stable in frequency that they, during travel maintain a predetermined phase position in relation to each other, each variation in distance between the radio station and the aeroplane will result in a variation in the relative phase positions between the two voltages fed to the phase detector and if the oscillators are initially correct in phase the output voltage from the phase detector will be a measure of the distance to the radio station. It is to be observed that the transmission of information takes place in one direction only, namely from the station to the aeroplane.

The smallest possible band width in the transmission channel for a separately working radio navigation system is equal to the double maximum Doppler-shift. If the maximum speed of the aeroplane is assumed to be 300 meters/sec and the signal frequency is assumed to be equal to 100 kc./s. the maximum Doppler shift will be 0.1 c./s. and the minimum band width ±0.1 c./s.

FIG. 3 shows how the aeroplane equipment shown in FIG. 2 may be modified in accordance with the principles of the invention. The receiver aerial $A_r$, the receiver amplifier R, the reference oscillator $O_{ref}$ and the phase detector D have the same function as described above, while further in the branch between the receiver amplifier R and the phase detector D there is included a phase shift device SH, which is controlled by a speed measuring device V. The speed measuring device V is assumed to measure the velocity of the vehicle and delivers a signal representing this velocity to the phase shift device which continuously shifts the phase of the incoming signal in dependence on the measured velocity. A continuous variation of the phase of an A.C.-voltage, however, corresponds to a variation in the frequency and the phase shift device is regulated in such direction that the frequency variation caused by the phase shift device counteracts the Doppler-shift caused by the velocity of the vehicle. If the measured velocity were exactly correct and the circuit constants were correctly set the whole Doppler-shift should be compensated and after the phase shift device a single frequency only should appear, namely the initial carrier frequency (without Doppler-shift). On the contrary, as is often the case, if the speed measuring device gives a slightly erroneous velocity indication only a part of the Doppler shift will be compensated and after the phase shift device a signal will appear which deviates in frequency from the carrier frequency, which deviation, however, is only a fraction of the Doppler-shift. If $k$ is assumed to be the percental maximum error in the velocity indication of the speed measuring device, the frequency band which has to be transmitted after the phase shift device will be equal to ±$k$ percent of the maximum Doppler-shift. In the shown example therefore a band pass filter BP having a middle frequency equal to the carrier frequency and a band width equal to ±$k$ percent of the maximum Doppler-shift is connected between the phase shift device SH and the phase detector D, $k$ being the percental maximum error in the velocity indication of the device V. If $k$ is equal to 10% the band width of the band pass filter in the previously mentioned example will be equal to ±0.01 c./s. As it is difficult to manufacture band pass filters having a band width of this small value it is suitable to place the filter LP after the phase detector as shown in FIG. 3a and then make it a low pass filter having a band width equal to $k$ percent of the maximum doppler-shift.

In an alternative embodiment illustrated in FIG. 3b the phase-shift device is included in the connection line between the reference oscillator $O_{ref}$ and the phase detector D which gives the same Doppler-compensation but in this case the filter must be placed at the output of the phase detector and shaped as a low pass filter. This embodiment is advantageous due to the fact that the phase shift device connected in this way is not affected by the substantial noise which always appears together with the incoming signal and which noise eventually could overload the phase shift device.

The output signal from the phase detector indicates the error $\Delta f$ in the distance indication as given by the speed measuring device and has to be combined with the said distance indication from the speed measuring device for achieving the correct indication. The distance indication of the speed measuring device can for example be calculated by distance integrators connected to the device or read directly upon the phase shifter SH.

FIG. 4 shows schematically a conventional automatic dead reckoning device or calculator with associated input data and output data units. The device illustrated is of the analogue type.

Input data to the automatic dead reckoning device generally referenced with 10 is achieved on the one hand from the air data unit 11, which continuously measures the velocity v of the aeroplane relative to the surrounding air and on the other hand from a gyro compass 12 which indicates the course $\theta$ of the aeroplane and the pitch angle.

These input data are fed to a coordinate converter 13 which by means of the known value of the pitch angle $\alpha$ first computes the horizontal components of the measured velocity and then by means of the course angle $\theta$ divides this horizontal component into velocity components in latitude or $x$-direction and longitude or $y$-direction, respectively, so that at the output of the converter 13 signals will appear, which indicate the measured horizontal velocity of the aeroplane in $x$- and $y$-direction, respectively. The velocity may be represented by an A.C.-voltage and the dividing into components may be produced by means of conventional resolvers, the rotors of which are set in accordance with the measured angles. The correction required due to the principle building up of the system (grid angle correction) is effected in a correction unit 14, whereafter the corrected velocities are fed to one of the inputs of so called distance integrators 15 each having two summator inputs. Two such distance integrators are arranged, one for the x-direction and one for the y-direction. The other input of each distance integrator is connected to a wind correction unit 16, which is adapted to produce signals representing the estimated wind velocities in the x- and y-directions. The wind correction unit 16 may consist of a potentiometer and a resolver, the potentiometer being set in accordance with the estimated wind velocity and the resolver being set in accordance with the wind direction. The wind components are added to the measured and corrected velocity components for the aeroplane, whereafter the result is integrated in the distance integrators. The output voltage from the integrators then will represent the coordinates of the aeroplane in x- and y-directions, respectively, in relation to a predetermined point. The output magnitudes are presented on suitable instruments via an output data unit 17 which effects the eventually required coordinate transformations depending on the wanted type of presentation. In the present case the distance components in x- and y-direction are assumed to be re-combined so that at the output of the calculator there is produced a signal representing the computed distance $\int_c$ to a predetermined point, e.g. a radio station.

FIG. 5 shows a complete receiver apparatus for a radionavigation system of $\int$-$\int$ type which according to the principles of the invention receives coarse information about the position of the vehicle from the previously described automatic dead reckoning device 10 for the purpose of Doppler-compensation the said dead reckoning device being in turn corrected by the radio navigation system. The means required for presentation of the output data are situated in the coarse navigation device. The double contouring of certain blocks indicates that corresponding units are present in a number equal to the maximum number of radio stations which are used simultaneously. The apparatus comprises a receiver aerial 20 and a receiver amplifier 21, further a highly stable oscillator 22 which is assumed to produce a frequency which is higher than the received frequency and a frequency dividing device 23 for dividing the oscillator frequency to the same value as the received frequency. A corresponding oscillator and frequency dividing device are assumed to be situated in each of the fixed radio stations which transmit different carrier frequencies. The output of the frequency dividing device is connected to one of the inputs of a phase detector 25, while the receiver amplifier 21 is connected via a phase shifting device 24 to the other input of the phase detector. The phase shifting device is so constructed that it produces a phase shift of the incoming signal, which phase shift is proportional to the control signal fed to the device and is controlled by a signal from the automatic dead reckoning device representing the computed distance $\int_c$ to the actual radio station. At a certain velocity of the aeroplane the phase shift thus will vary continuously, which according to the preceding corresponds to a frequency variation of, the high frequency signal, the phase shift device being connected such that the frequency variation caused by it counteracts the Doppler-shift of the incoming signal. Provided that the phases are correct from the beginning and that the aeroplane oscillator and the oscillator in the actual radio station maintain their mutual phase positions the output voltage from the phase detector will represent the difference between the distance measured by the radio system and the distance calculated by the automatic dead reckoning device, i.e. if the radio system is assumed to be correct, the error in the distance indication from the automatic dead reckoning device.

The error signals are fed via a filter unit 26 comprising low pass filters, a coordinate transformer unit 27 for dividing the distance errors $\Delta\int$ to corresponding latitude and longitude error $\Delta x$, $\Delta y$ and a summator 28 for adding the contributions in x-direction and y-direction, respectively, from the different distance measurements to the wind correction unit or wind memory of the automatic dead reckoning device, which wind memory will be described more fully in the following, and further to the distance integrators for correcting the input signals to the distance integrators in such a direction, that the error signals in the feed-back system are regulated to zero. The low pass filters included in the filter unit 26 may be conventional integrating RC-circuits having a limit frequency equal to $k$ percent of the frequency band which should have been required if the radio navigation system had been alone and thus had had to transmit the whole information quantity required for determining the position, $k$ being the percental maximum error in the velocity indication of the dead reckoning device. If $k$ in the previously mentioned example is assumed to be equal to 10% the limit frequency will be of magnitude 0.01 c./s. Alternatively the low pass filters at the output of the phase detector may according to the preceding be replaced by band pass filters connected in the connection line between the phase shift device 24 and the phase detector 25, as is indicated in the embodiment illustrated in FIG. 5a.

As is previously mentioned the information from the radio navigation system is not unambiguous and a lot of solutions are possible for each combination of measured distances represented by the phase of a received wave. However, by combining the radio navigation system with an automatic dead reckoning device which always gives a position determination close to the correct position and by making the transmission channel in the radio navigation system part of a correction loop the correct solution is selected automatically since the false solutions correspond to such a great deviation from the position indication given by the dead reckoning device that these solutions are suppressed.

The wind memory consists suitably of an integrator 31 connected in each branch, as is shown schematically in FIG. 6 in which the radio navigation system is summarized in a block 30, and 13, 14 as before indicate converter and correction unit, 15 indicates distance integrators and 17 output data unit with coordinate convertor. By including this further integrator in the closed loop system a servo system of second degree is achieved and both position error and velocity error will be regulated to zero. As such a system with two integrators connected in series is unstable some sort of stabilizing means must be arranged, for example a shunt in the shape form of the resistance 32 across the wind memory integrator.

FIG. 7 shows a preferred modification of the embodiment shown in FIG. 5, the same reference numerals as in FIG. 5 being used for corresponding components. The phase shift device 24 is in this case included in the connection line between the phase detector and the reference oscillator and is as before controlled from the output of the dead reckoning device with a signal representing the calculated distance $\int_c$ to the actual radio station. In this case Doppler-compensation is achieved in that both the input signals to the phase detector, when the aeroplane has a certain velocity relative to the radio station, change their frequency practically with the same value, one due to the Doppler-effect and the other due to the phase shift produced by the phase shift device 24, and the transmission channel after the phase detector can be dimensioned for a frequency band corresponding to the maximum difference between the Doppler-shift and the frequency variation caused by the phase shift device. A low pass filter 26 having the same function and dimensioning as in the preceding example is connected to the output of the phase detector and the output signal from the phase detector is used to support or correct the automatic dead reckoning device.

FIG. 8 shows a radio navigation apparatus working according to the hyperbolic principle and constructed in accordance with the principles of the invention. In hyperbolic systems there is no need for a reference oscillator in the aeroplane, the determination of the position being effected by comparing the phase of two radio signals received from different radio stations, the output signal from the phase detector in this case representing a measured difference in distance to the two stations. Doppler-shift now appears in both the signals fed to the phase detector and the Doppler-effect may according to the invention be compensated in that, as is shown in FIG. 8, a phase shift device 24 is included in each input lead to the phase detector 25. The automatic dead reckoning device is assumed to produce signals representing the calculated distances $f_1$ and $f_2$ to the two stations and these signals are used to control resp. phase shift device in order to compensate the Doppler-effect in each received signal. As the received signals in the two branches in this case each have a different carrier frequency the amplification factors in the circuits leading from the output of the dead reckoning device to the phase shifting devices must be matched to the actual frequency in each branch, so that Doppler-compensation really is achieved. Means not shown must furthermore be arranged which ensure that the signals fed to the phase detector 25 have the same base frequency.

The output signal from the phase detector 25 which in the absence of feed back from the output of the dead reckoning device should have represented a measured difference in distance to the two radio stations, which difference in a way known per se is used for determining the position, will now represent the error $\Delta D$ in this difference and the error signal appearing at the output of the detector is fed to the automatic dead reckoning device for correcting the same so that the error in the feed-back system is regulated against zero. According to the invention an extremely narrow filter 26 having the same function and dimensioning as described previously is arranged at the output of the detector. The low pass filter 26 may be replaced by two band pass filters 26' on the high frequency side of the phase detector as shown in FIG. 8a.

FIG. 9 shows a preferred modification of the apparatus according to FIG. 8, a phase shift device 24 in this case being included only in one of the input leads to the phase detector 25. The phase shift device is in this case controlled from the output of the dead reckoning device with a signal representing the calculated distance difference $f_1-f_2$ and as the signals in the two branches have different carrier frequencies measures must furthermore be taken for compensating this difference in carrier frequency. This may for example be achieved in that the phase shift is effected after converting the incoming signals to the same comparison or intermediate frequency. The output signal of the phase detector will as before represent the difference $\Delta D$ between the measured distance difference and the calculated distance difference and the same compensation for the Doppler-shift as in the previous case is achieved after the comparison between the phases of the two signals in the phase detector. The error signal at the output of the phase detector supports or corrects the automatic dead reckoning device so that the error in the feed-back system approaches zero. The narrow filter is arranged at the output of the phase detector and shaped as a low pass filter 26 having a band width equal to $k$ percent of the maximum Doppler-shift, $k$ being the percental maximum error in the velocity as measured by the automatic dead reckoning device.

In FIG. 10 is shown the circuit diagram of a phase detector chosen as an example. This detector is of conventional type and is not described in detail.

If a signal $V_r$ having the phase position 0 is fed to one of the inputs and a signal $V_s$ having the phase position $\phi$ is fed to the other input an output voltage $V_0$ is received:

$$V_0 = V_r \cos \phi (V_r < V_s)$$
$$V_0 = V_s \cos \phi (V_r > V_s)$$

The phase shift device shown as example in FIG. 11 comprises a motor amplifier 40 having two summator inputs, which amplifier controls a motor 41 the shaft of which is mechanically connected to a potentiometer 42 and a resolver 43. The signal from the potentiometer 42 is fed back to one of the inputs of the amplifier 40, while the control signal for the phase shift device, i.e. in normal use the output signal from the automatic dead reckoning device representing a calculated distance or a calculated distance difference, is fed to the other input of the amplifier in order to be compared with the voltage from the potentiometer 42. The motor 41 then will drive the potentiometer 42 and the resolver 43 until the two voltages at the input of the amplifier are substantially compensating each other.

The voltage to be phase shifted is fed to the input winding of the resolver via the input terminal 45 and provided that both the potentiometer and the resolver have a linear response the voltage produced at the output 46 will have a phase angle in relation to the phase of the input voltage which is proportional to the value of the control signal.

Many modifications of the described embodiments are possible within the scope of the invention. Thus, the described dead reckoning device can be replaced by any coarse navigation system working according to the principle for dead reckoning, for example a so called doppler-radar system, an inertial navigation system or the like. Instead of having a complete coarse navigation device which can work separately if required, the means for presentation of the output data being associated with the coarse navigation device, the presentation of the output data can also take place from the radio navigation system, it being possible in this case to replace the coarse navigation device with a simple speed measuring device or the like. The same advantages with respect to the Doppler-compensation and the narrow transmission channel is achieved in this case. Although in the specification and claims there is only mentioned a continuous unmodulated carrier the principles of the invention can also be applied in the equivalent systems working with transmission of pulse shaped signals instead of continuous signals, the phase of the continuous wave then will correspond to the time position of the pulses. The phase shift device in the described embodiments are in the pulse signal case replaced by a device for variation of the time position of the pulses, i.e. in principle a time delaying device. The function of the band pass filter may be achieved by means of an inhibit circuit which is conductive for pulses only during a small fraction of a period of the pulse shaped signal, a decrease of the width of the transmission channel, corresponding to a decrease of the band width in the device for the continuous wave can be achieved by decreasing the length of the conductive period.

All computing means may be of analogue type or digital type and the different components may be of any suitable construction.

What is claimed is:

1. A method of navigating a vehicle comprising the steps of, computing by dead reckoning techniques the relative velocity between the vehicle and a positionally fixed radio transmitter, generating a local signal on the vehicle which is frequency coherent with the transmitted signal from the positionally fixed radio transmitter, receiving the transmitted signal, shifting the relative phase of the transmitted signal as received on the vehicle and the locally generated signal as a function of the computed relative velocity between the vehicle and the transmitter, and comparing the phase difference between the relatively shifted transmitted signal and the locally generated coherent signal to determine the phase shift therebetween which shift corresponds to the error in the computation.

2. A vehicle mounted radio navigation system for providing a function of the position displacement of the vehicle from a positionally fixed radio transmitter comprising means for receiving the signal transmitted by the positionally fixed transmitter, means for locally generating a signal coherent therewith, a dead reckoning computer for providing a signal corresponding to a function of the velocity of the vehicle with respect to the transmitter, and means responsive to the received signal, the locally generated coherent signal and the signal corresponding to the function of the computed velocity of the vehicle with respect to the transmitter for shifting the relative phase of the received signal and the locally generated coherent signal as a function of the signal corresponding to a function of the computed velocity of the vehicle with respect to the transmitter and comparing the phase difference between the said relatively shifted signals to provide an error signal corresponding to the phase difference, which error signal is indicative of the error in the computing means.

3. A radio navigation system for providing the positional displacement of a receiver from a transmitter comprising, means for receiving the signal transmitted by a positionally fixed transmitter, means for locally generating a signal coherent with the transmitted signal, dead reckoning computing means including an integrator for providing a signal corresponding to the integral of the relative velocity between the transmitter and receiver, means, including a narrow signal filter responsive to the received signal, the locally generated signal and the signal corresponding to the integral of the relative velocity between the transmitter and receiver, for shifting the relative phase of the received and locally generated signals as a function of the signal corresponding to the integral of the relative velocity between the transmitter and receiver and providing an output corresponding to the phase difference between the relatively shifted signals, and means for applying said output to the computing means for addition to the integrator whereby the phase difference is regulated to zero.

4. A radio navigation system as set forth in claim 3 in which said narrow filter passes the signal after detection and is of the low pass type.

5. A radio navigation system as set forth in claim 4 in which the filter bandwidth is equal to $k$ percent of the maximum Doppler shift of the transmitted signal and where $k$ is the maximum percentage error in the velocity determination by the computer.

6. A radio navigation system as set forth in claim 3 in which said narrow filter passes the signal before detection and is of the band pass type.

7. A radio navigation system as set forth in claim 6 in which the filter bandwidth is equal to $k$ percent of the maximum Doppler shift of the transmitted signal and where $k$ is the maximum percentage error in the velocity determination by the computer.

8. A radio navigation system as set forth in claim 3 in which the means for shifting the relative phase of the received and locally generated signals as a function of the signal which corresponds to the integral of the relative velocity between the transmitter and receiver operates on the received signal.

9. A radio navigation system as set forth in claim 3 in which the means for shifting the relative phase of the received and locally generated signals as a function of the signal which corresponds to the integral of the relative velocity between the transmitter and receiver operates on the locally generated signal.

10. A radio navigation system for providing the positional displacement of a vehicle from a first and a second fixed radio wave transmitter comprising first and second radio wave receivers mounted on the vehicle for receiving the radio waves transmitted by the first and second transmitters, respectively, dead reckoning computing means including an integrator for providing a first control signal corresponding to the integral of the relative velocity between the vehicle and the first transmitter and a second control signal corresponding to the integral of the relative velocity between the vehicle and the second transmitter, means including a narrow filter means responsive to the first and second receivers and the computer for shifting the phase of the first receiver output as a function of the first control signal and the phase of the second receiver output as a function of the second control signal and detecting the phase difference between the phase shifted signals to provide an output corresponding thereto, and means for applying said output signal to the computing means for addition to the integrator whereby the phase difference is regulated to zero.

11. A radio navigation system as set forth in claim 10 in which said narrow filter means passes the signal after phase detection and is of the low pass type.

12. A radio navigation system as set forth in claim 11 in which the filter bandwidth is equal to $k$ percent of the maximum Doppler shift of the transmitted signals and where $k$ is the maximum percentage error in the relative velocity determination.

13. A radio navigation system as set forth in claim 10 in which said narrow filter means passes the received signals after shifting but before phase detection and is of the band pass type.

14. A radio navigation system as set forth in claim 13 in which the bandwidth of the filter means is $k$ percent of the maximum Doppler shift of the transmitted signals and where $k$ is the maximum percentage error in the relative velocity determination.

15. A radio navigation system for providing the positional displacement of a vehicle from a first and a second fixed radiowave transmitter comprising, first and second radio wave receivers mounted on the vehicle for receiving the radio waves transmitted by the first and second transmitters, respectively, dead reckoning computing means including an integrator for providing a control signal corresponding to the difference in the distance between the vehicle and the first and second transmitters, a phase shifter responsive to the first receiver and the control signal for shifting the phase of the first receiver output as a function of said control signal, a phase detector responsive to the shifted signal, and the second receiver output for providing a signal corresponding to the phase difference between the two signals, a low pass filter having a narrow bandwidth for filtering the phase detector output, and means for applying the filter output to the computing means for addition to the integrator whereby the phase difference of the signals applied to phase detector is regulated to zero.

16. A radio navigation system as set forth in claim 15 in which the low pass filter has a pass band equal to $k$ percent of the maximum Doppler shift of the transmitted signals and where $k$ is the maximum percentage error in the computation of the difference in the distance between the vehicle and the first and second transmitters.

References Cited by the Examiner

UNITED STATES PATENTS

| 2,924,820 | 2/60 | Dishal et al. | |
|---|---|---|---|
| 3,024,462 | 3/62 | Hugon | 343—105 |
| 3,025,519 | 3/62 | Brown et al. | 343—112 X |
| 3,150,372 | 9/64 | Groth. | |

OTHER REFERENCES

IRE Transactions on Military Electronics, April–July 1960, pp. 332–335.

CHESTER L. JUSTUS, *Primary Examiner.*